US008358861B2

(12) United States Patent  (10) Patent No.: US 8,358,861 B2
Odagiri  (45) Date of Patent: Jan. 22, 2013

(54) IMAGE COMPRESSION DEVICE AND IMAGE DECOMPRESSION DEVICE

(75) Inventor: Junichi Odagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 186 days.

(21) Appl. No.: 12/926,953

(22) Filed: Dec. 20, 2010

(65) Prior Publication Data

US 2011/0123126 A1   May 26, 2011

Related U.S. Application Data

(63) Continuation of application No. PCT/JP2008/001694, filed on Jun. 27, 2008.

(51) Int. Cl.
 *G06K 9/36* (2006.01)
 *G06K 9/46* (2006.01)
(52) U.S. Cl. ............... 382/238; 382/232; 382/233
(58) Field of Classification Search .................. None
See application file for complete search history.

(56) References Cited

U.S. PATENT DOCUMENTS

| | | | |
|---|---|---|---|
| 4,093,962 A | 6/1978 | Ishiguro et al. | |
| 5,596,602 A | 1/1997 | Couwenhoven et al. | |
| 6,233,355 B1 | 5/2001 | Kajiwara | |
| 6,532,306 B1 * | 3/2003 | Boon et al. | 382/232 |
| 2001/0024524 A1 | 9/2001 | So et al. | |
| 2003/0118242 A1 * | 6/2003 | Nakayama et al. | 382/245 |
| 2006/0133481 A1 | 6/2006 | Chujoh | |
| 2008/0226183 A1 * | 9/2008 | Lei et al. | 382/238 |

FOREIGN PATENT DOCUMENTS

| | | |
|---|---|---|
| EP | 0 827 342 | 3/1998 |
| JP | 8-298465 | 11/1996 |
| JP | 9-200774 | 7/1997 |
| JP | 10-20893 | 1/1998 |
| JP | 10-336682 | 12/1998 |
| JP | 3228943 | 9/2001 |
| JP | 2006-340134 | 12/2006 |
| WO | 97/35434 | 9/1997 |

OTHER PUBLICATIONS

International Search Report for PCT/JP2008/001694, mailed Aug. 26, 2008.
Supplemental European Search Report for corresponding European Application 08790093.2-1522; sated Jan. 25, 2012.
European Office Action dated Oct. 1, 2012 in European Patent No. 08 790 093.2-1522.

* cited by examiner

*Primary Examiner* — Li Liu
(74) *Attorney, Agent, or Firm* — Staas & Halsey LLP

(57) ABSTRACT

A compression device using a prediction coding method performs a prediction for one line in an image to be compressed by using each of a plurality of the same types of predictors as plural types of predictors, and determines one quantizer out of plural types of quantizers based on a prediction error amount of a predictor having the smallest prediction error. It also performs a prediction for a prescribed pixel block in the one line, and identifies one predictor out of the plural types of predictors based on a type of a predictor having the smallest prediction error. Then, it compresses data of the prescribed pixel block by using the identified predictor and the determined quantizer. A decompression device decompresses the compressed image data to generate the image to be compressed by using an inverse quantizer corresponding to the determined quantizer and the identified predictor.

8 Claims, 23 Drawing Sheets

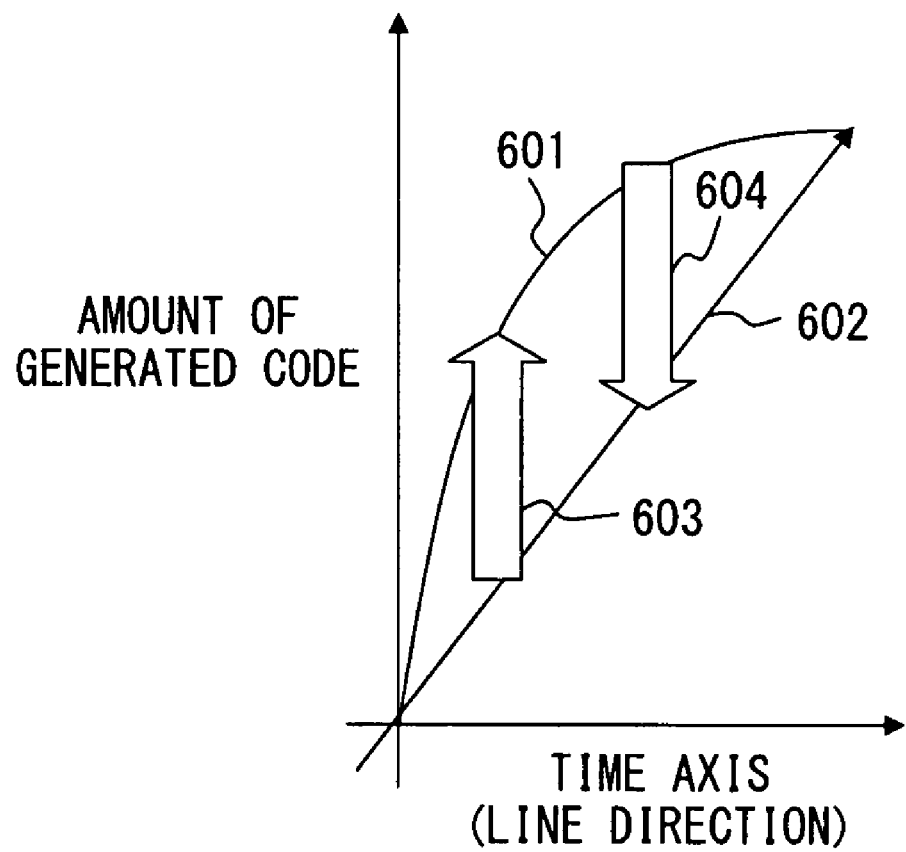
F I G. 6

| PREDICTION ERROR | PREDICTION ERROR QUANTIZATION VALUE | QUANTIZATION NUMBER |
|---|---|---|
| −21~ | −28 | 7 |
| −8~−20 | −12 | 5 |
| −3~−7 | −4 | 3 |
| −2~2 | 0 | 1 |
| 3~7 | 4 | 2 |
| 8~20 | 12 | 4 |
| 21~ | 28 | 6 |

F I G. 1 1

| PREDICTION ERROR | PREDICTION ERROR QUANTIZATION VALUE | QUANTIZATION NUMBER |
|---|---|---|
| −41∼ | −56 | 7 |
| −15∼−40 | −24 | 5 |
| −5∼−14 | −8 | 3 |
| −4∼4 | 0 | 1 |
| 5∼14 | 8 | 2 |
| 15∼40 | 24 | 4 |
| 41∼ | 56 | 6 |

F I G. 1 2

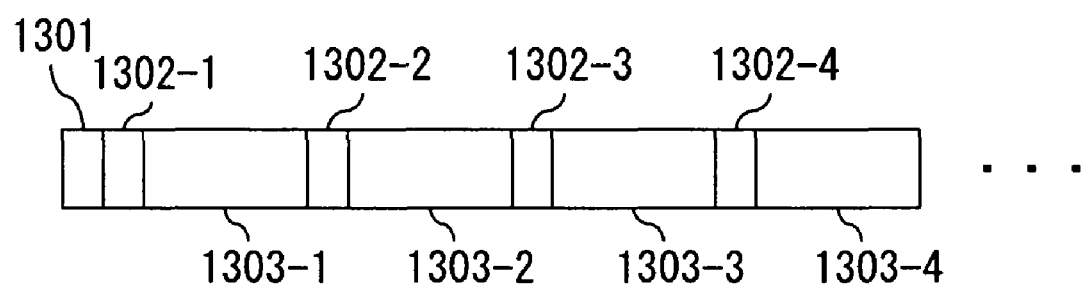
F I G. 13

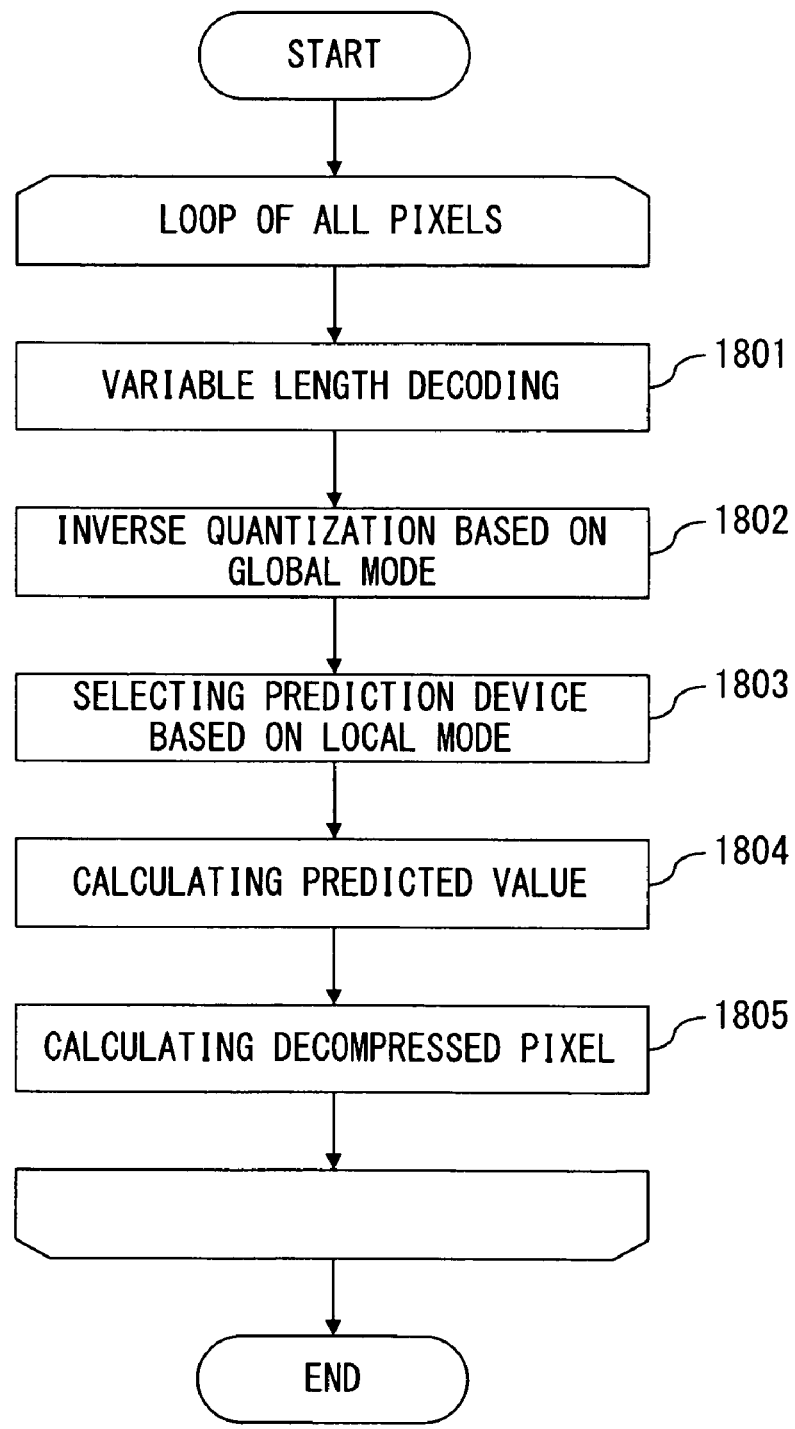
F I G. 1 8

| QUANTIZATION NUMBER | PREDICTION ERROR QUANTIZATION VALUE |
|---|---|
| 7 | −28 |
| 5 | −12 |
| 3 | −4 |
| 1 | 0 |
| 2 | 4 |
| 4 | 12 |
| 6 | 28 |

F I G. 1 9

| QUANTIZATION NUMBER | PREDICTION ERROR QUANTIZATION VALUE |
|---|---|
| 7 | −56 |
| 5 | −24 |
| 3 | −8 |
| 1 | 0 |
| 2 | 8 |
| 4 | 24 |
| 6 | 56 |

FIG. 20

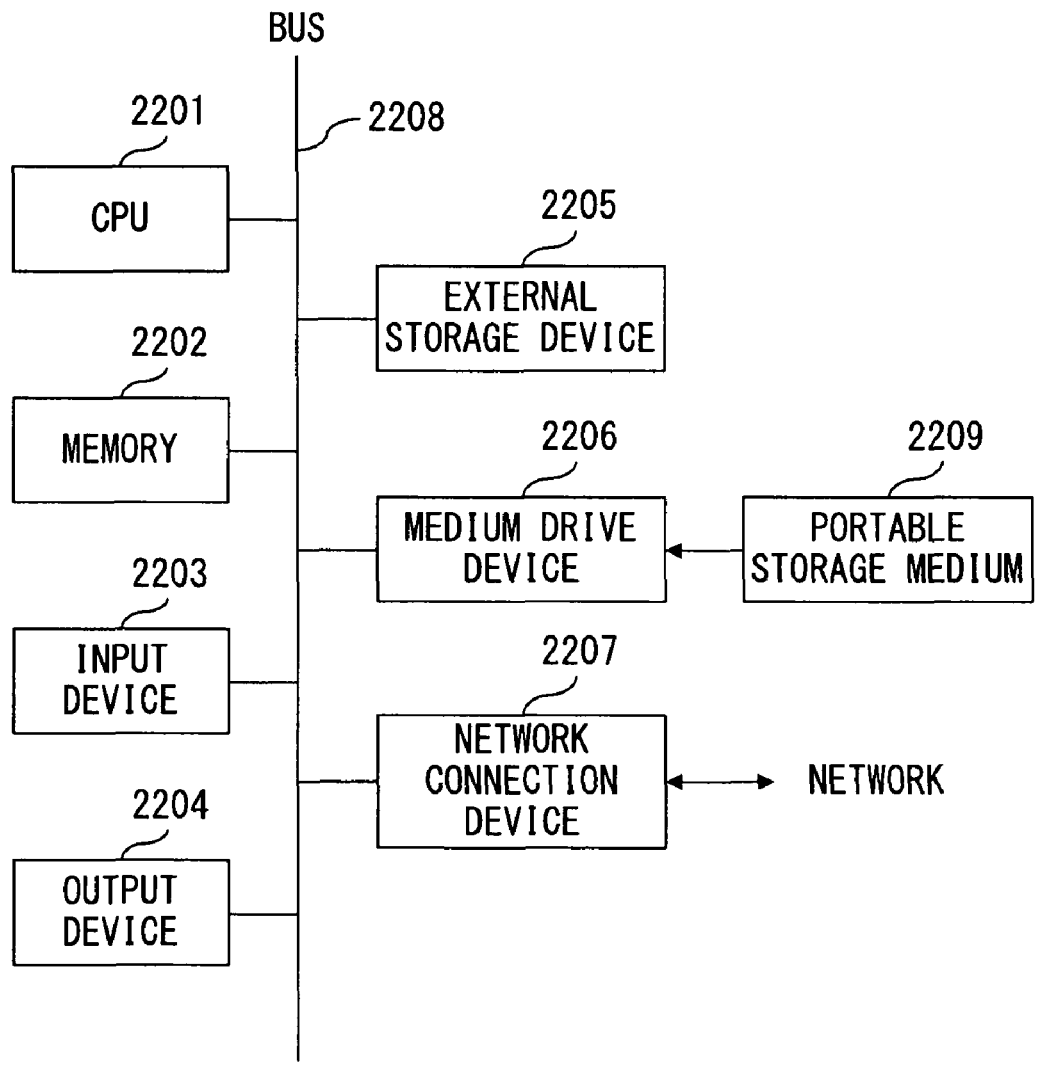
F I G. 2 2

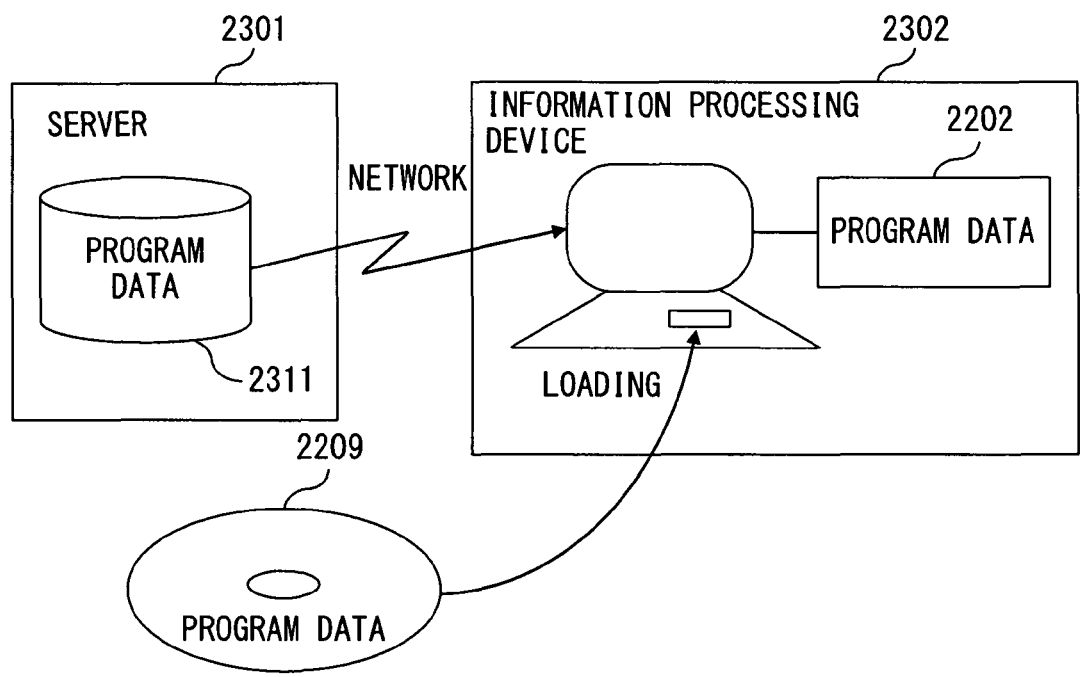
F I G. 2 3

IMAGE COMPRESSION DEVICE AND IMAGE DECOMPRESSION DEVICE

CROSS-REFERENCE TO RELATED APPLICATIONS

This application is a continuation application of International PCT Application No. PCT/JP2008/001694 which was filed on Jun. 27, 2008.

FIELD

The present invention relates to an image compression device and a image decompression device using a prediction coding method (differential pulse code modulation, DPCM).

BACKGROUND

The image compressing technology for reducing the amount of data by compressing image data is used for equipment in various fields. An in-vehicle device belongs to one of the fields. To apply the image compressing technology to moving pictures displayed on the in-vehicle device, the following conditions are to be satisfied.

(1) High Image Quality

It is necessary to attain high image quality both in natural images and CG (computer graphics) images. Well known as the image information processed in an in-vehicle device are natural images represented by common television images, movies, etc., and CG images (digital images) represented by a map of a car navigation system etc. They are quite different from each other in characteristics of the images. That is, natural images include many low frequency components and digital images include many high frequency components. In the recent in-vehicle devices and mobile terminals such as cellular phones, both digital images such as maps etc. and natural images such as television images, movies etc. are processed, and effective image compressing technology has been demanded for the images different in characteristics.

(2) Low Delay

Video information is transmitted normally by an in-vehicle local area network (LAN). In this case, to display equivalent images between front seats and rear seats in a vehicle without a delay of screen display, it is necessary to quickly perform compressing, transmitting, and decompressing processes with less delay.

(3) Light in Weight

When a multiplex transmission is performed, an image compression device and an image decompression device are required for each LAN terminal. Therefore, each device is to have a small circuit and to be light in weight.

A prediction coding method for predicting a pixel value for each pixel is known as a variation of image compressing technology. In the image compressing technology using the prediction coding method, the amount of generated code can be precisely adjusted for both images having different characteristics such as natural images and CG images by changing the quantizing step width.

FIG. 1 illustrates the image compressing process using the prediction coding method. A predictor 102 predicts the pixel value of a target pixel from the pixel values of the surrounding pixels when uncompressed input data 101 is input, and outputs the difference between an actual pixel value and a predicted value as a prediction error.

For example, in a normal plane prediction, as illustrated in FIG. 2, the pixel value X of a target pixel 214 on a target line 202 is predicted using an adjacent pixel 213 on the target line 202 and the adjacent pixels 211 and 212 on an immediately preceding line 201. Assuming that the pixel values of the pixels 213, 211, and 212 are A, B, and C respectively, the predicted value X' of the target pixel 214 is obtained by the following equation.

$$X' = A + C - B \qquad (1)$$

In this case, the prediction is made based on the assumption that the image is generally flat, and the pixel values of the adjacent pixels are generally close to one another.

Next, a quantizer 103 quantizes the prediction error X−X' and converts it into a representative value. Depending on the size of the quantizing step width used by the quantizer 103, the representative values for the same input data 101 are different.

Next, a variable length coder 104 assigns a variable length code depending on the frequency of occurrence of the representative value, and generates a compression code. Since the code length of the variable length code is normally inverse proportional to the frequency of occurrence, the code lengths are different when representative values are different. Therefore, the compression efficiency for the input data 101 depends on the size of the quantizing step width.

FIG. 3 illustrates an example of a quantization representative value when the quantizing step width is small. The horizontal axis indicates the prediction error output from the predictor 102, and the vertical axis indicates the frequency of occurrence of a prediction error. In this example, prediction errors −30 through +30 are divided into five quantizing steps 301 through 305, and the representative values are −18, −6, 0, +6, and +18 respectively. In this case, the code lengths of the representative values −18 and +18 are the longest, the code lengths of the representative values −6 and +6 are intermediate, and the code lengths of the representative values 0 is the shortest.

On the other hand, FIG. 4 illustrates an example of a quantization representative value when the quantizing step width is large. In this example, the prediction error −30 through +30 are divided into three quantizing steps 401 through 403, and the representative values are −15, 0, and +15 respectively. As with the case in FIG. 3, the code lengths of the representative value 0 is the shortest, but the representative values −15 and +15 can be assigned intermediate code lengths.

Thus, a quantizer having a small quantizing step width generates a small quantization error (good image quality), but its compression efficiency is reduced. On the other hand, since a quantizer having a large quantizing step width indicates a short total code length, its compression efficiency is enhanced, but the quantization error is large (degraded image quality).

In the image compressing process above, a method for selectively switching different types of prediction algorithms is known (for example, refer to Patent Document 1). In this method, when different types of voice signals coexist, two predictors which operate with different prediction algorithms are provided, and it is determined by a mode determination as to which predicted value is used in outputting code.

In addition, a feedback-type code amount controlling method is also known (for example, refer to Patent Documents 2 and 3). In this controlling method, compressed data is fetched into a rate buffer at a variable rate, and the bit transmission rate of the compressed data is amended depending on the sufficiency of the rate buffer. In this process, the bit transmission rate can be amended by selecting one of a plurality of quantizers.

FIG. 5 illustrates an example of a configuration of a hypothetical image compression device obtained by combining a circuit for switching between two predictors and a circuit for switching between two quantizers. The image compression device includes a buffer 501, predictors 502-1 and 502-2, selection units 503, 505, and 507, a mode determination unit 504, quantizers 506-1 and 506-2, a variable length coder 508, a rate buffer 509, and a rate controller 510.

The buffer 501 stores pixels of one line or one frame of the input image data, and the predictors 502-1 and 502-2 output a prediction error of a target pixel based on different prediction algorithms. The mode determination unit 504 switches the selection unit 503 depending on the prediction errors of the predictors 502-1 and 502-2, and outputs one of the prediction errors to the selection unit 505.

The quantizers 506-1 and 506-2 quantize a prediction error by different quantizing step widths, and the variable length coder 508 converts a quantization representative value into a variable length code and outputs the code to the rate buffer 509. The rate controller 510 switches the selection units 505 and 507 depending on the sufficiency of the rate buffer 509, and selects the quantizer 506-1 or 506-2.

With the configuration above, both the predictor and the quantizer can be selectively switched, but there are the following problems.

(1) Since the compression efficiency depends on the selected predictor, the compression rate can be improved for the signals (images) of different characteristics by switching predictors. However, an amount of generated code depends on the predictor, and the mode determination unit 504 cannot monitor the amount of generated code. Therefore, the amount of code cannot be adjusted by the switching of the predictors.

(2) The rate controller 510 starts controlling the reduction of a transmission rate only when the sufficiency of the rate buffer 509 becomes high enough. Therefore, immediately after the start of the compression, a small quantizing step width is set, and a generated code amount 601 exceeds an average generated code amount 602, and the image quality is excessively high as indicated by an arrow 603 in FIG. 6. On the other hand, when the sufficiency of the rate buffer 509 becomes high, the quantizing step width becomes locally large, and the generated code amount 601 decreases and the image quality can be excessively degraded as indicated by an arrow 604. Especially, when there frequently occurs a dot fluctuation as in CG images, the prediction accuracy is degraded, thereby suddenly degrading the image quality.

Furthermore, there is a method of determining a quantizing step width from the prediction error of a predictor (for example, refer to Patent Document 4). In this method, a predictor is determined for each block obtained by segmenting an input voice signal at predetermined time intervals, and the quantizing step width is determined from the prediction error of the predictor. Then, with the determined predictor and quantizing step width, the voice signal of the block is compressed.

In this case, since the block referred to when the quantizing step width is determined is the same as the block to be quantized with the determined quantizing step width, the quantization is performed only according to local information (block). Since the quantizing step width is determined depending on the local information, there is the possibility of frequent occurrences of a change in step width (or the change width becomes large). Therefore, output data can be degraded in image quality.

Patent Document 1: Specification of Japanese Patent No. 3228943

Patent Document 2: Japanese Laid-open Patent Publication No. 8-298465

Patent Document 3: Specification of U.S. Pat. No. 4,093,962

Patent Document 4: Japanese Laid-open Patent Publication No. 10-20893

SUMMARY

An object of the present invention is to adjust the amount of compression code without local degradation of image quality in the image compressing technology using a prediction coding method.

A disclosed image compression device is an image compression device using a prediction coding method, and includes plural types of predictors, plural types of quantizers, a global evaluation unit, a local evaluation unit, and a compression unit.

The global evaluation unit performs a prediction for one line in an image to be compressed by using each of a plurality of the same types of predictors as the plural types of predictors, and determines one quantizer out of the plural types of quantizers based on a prediction error amount of a predictor having a smallest prediction error.

The local evaluation unit performs a prediction for a prescribed pixel block in the one line by using a plurality of the same types of predictors as the plural types of predictors, and identifies one predictor out of the plural types of predictors based on a type of a predictor having a smallest prediction error.

The compression unit compresses data of the prescribed pixel block by using the predictor identified by the local evaluation unit and the quantizer determined by the global evaluation unit.

A disclosed image decompression device is an image decompression device using a prediction coding method, and includes a reception unit and a decompression unit.

The reception unit receives quantizer information, predictor information and compressed image data. The quantizer information indicates one quantizer out of the plural types of quantizers determined based on a prediction error amount by a predictor having a smallest prediction error by performing a prediction for one line in an image to be compressed by using each of a plurality of the same types of predictors as the plural types of predictors.

The predictor information indicates one predictor out of the plural types of predictors identified based on a type of a predictor having a smallest prediction error by performing a prediction for a prescribed pixel block in the one line by using each of a plurality of the same types of predictors as the plural types of predictors.

The compressed image data is obtained by compressing the data of the prescribed pixel block by using the identified predictor and the determined quantizer. The decompression unit decompresses the compressed image data to generate the image to be compressed by using an inverse quantizer corresponding to the quantizer indicated by the quantizer information and the predictor indicated by the predictor information.

According to the image compression device and the image decompression device above, the prediction error can be reduced by selecting a predictor having a smaller error for each pixel block. In addition, since a quantizer is selected based on the image data in a range larger than the pixel block as a processing unit in the compressing process, a quantizing step width can be determined independent of local information.

If a prediction error is large as the tendency of a total of one line, the increase in the amount of generated code after the compression can be suppressed by selecting in advance a large quantizing step width. Furthermore, when a quantizing step width is to be changed in processing, the amount of change is not extremely large, thereby preventing outstanding degradation of image quality. Therefore, the amount of compression code can be adjusted without local degradation of image quality.

BRIEF DESCRIPTION OF DRAWINGS

FIG. 6 illustrates a change in amount of generated code when no global evaluation is performed;

FIG. 11 illustrates a quantization table when a quantizing step width is small;

FIG. 12 illustrates a quantization table when a quantizing step width is large;

FIG. 13 illustrates a compression code;

FIG. 18 is a flowchart of the image decompressing process;

FIG. 19 illustrates an inverse quantization table when a quantizing step width is small;

FIG. 20 illustrates an inverse quantization table when a quantizing step width is large;

FIG. 22 illustrates a configuration of an information processing device; and

FIG. 23 illustrates a method of providing a program and data.

DESCRIPTION OF EMBODIMENTS

The best modes for embodying the present invention are described below in detail with reference to the attached drawings.

As described above, it is known that the amount of generated code and image quality largely fluctuate depending on the type of a predictor and the type of images. On the other hand, when the prediction coding method is applied in the direction of a line to satisfy the conditions of high image quality, a low delay, and light weight, the prediction error obtained by switching predictors is globally (for each line) estimated not only by selectively switching different predictors respectively for natural images and CG images. Then, based on the estimation result for each line, the quantizing step width is adjusted so that the prescribed amount of generated code and the prescribed image quality can be obtained.

Figure 1:
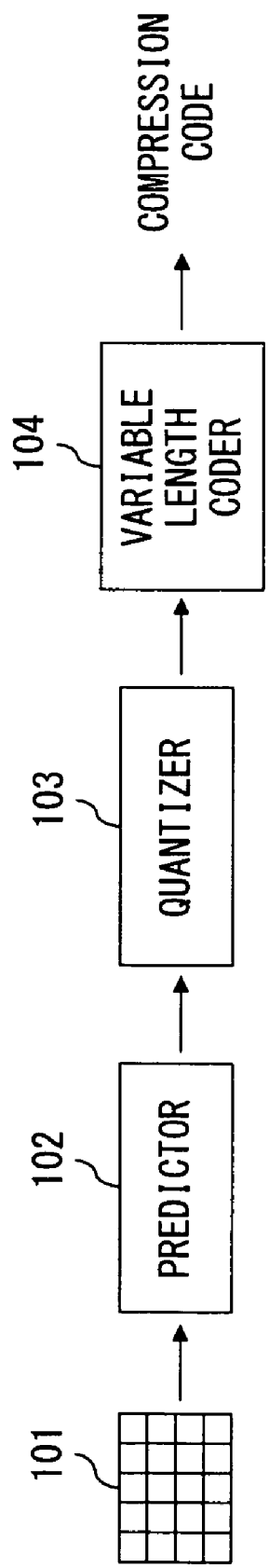
FIG. 1 illustrates the image compressing process using a prediction coding method.
Figure 2:
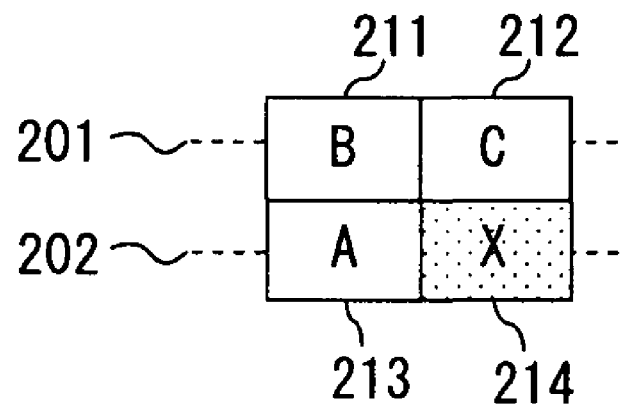
FIG. 2 illustrates a normal plane prediction.
Figure 3:
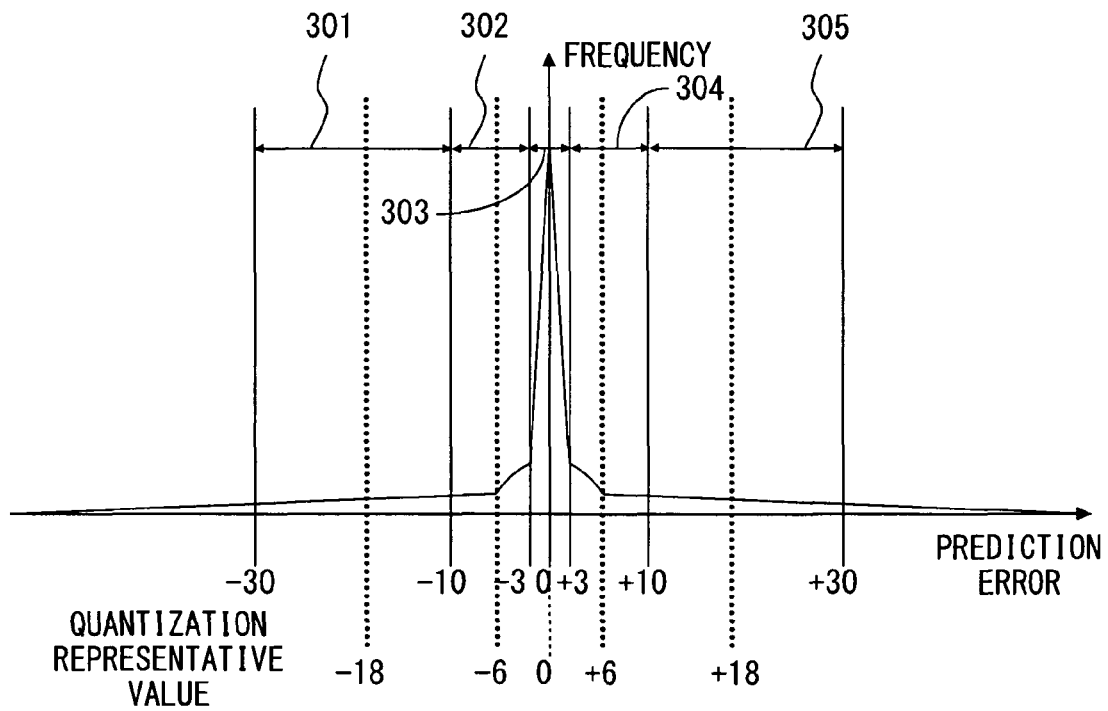
FIG. 3 illustrates quantization representative values when a quantizing step width is small.
Figure 4:
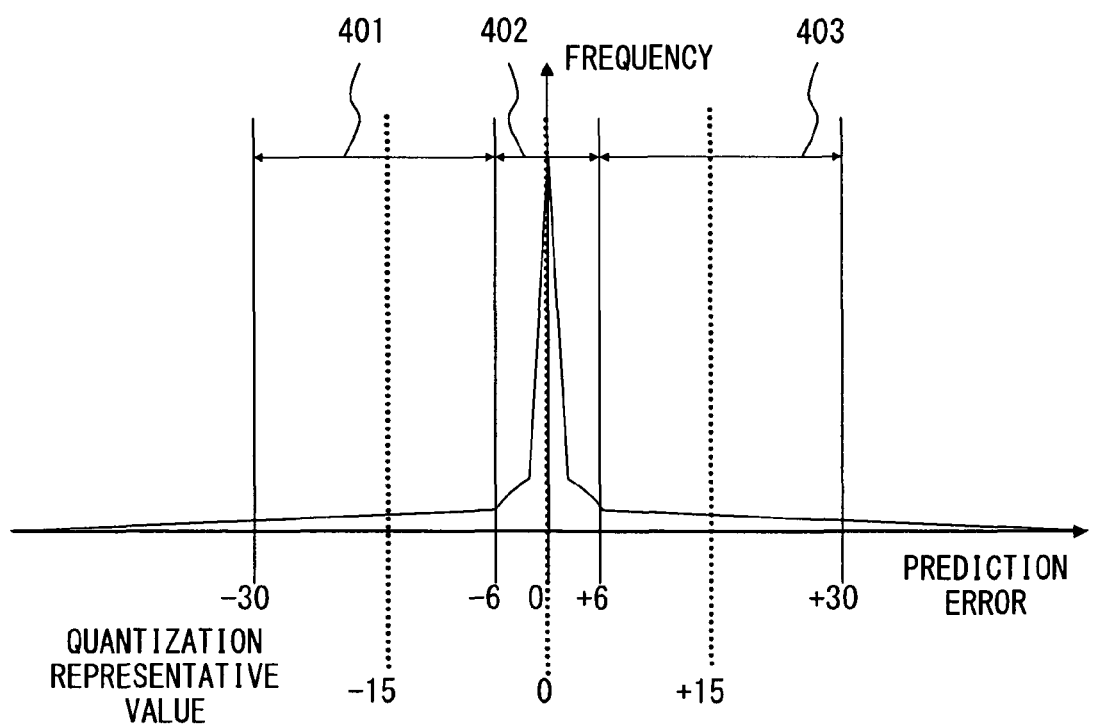
FIG. 4 illustrates quantization representative values when a quantizing step width is small.
Figure 5:
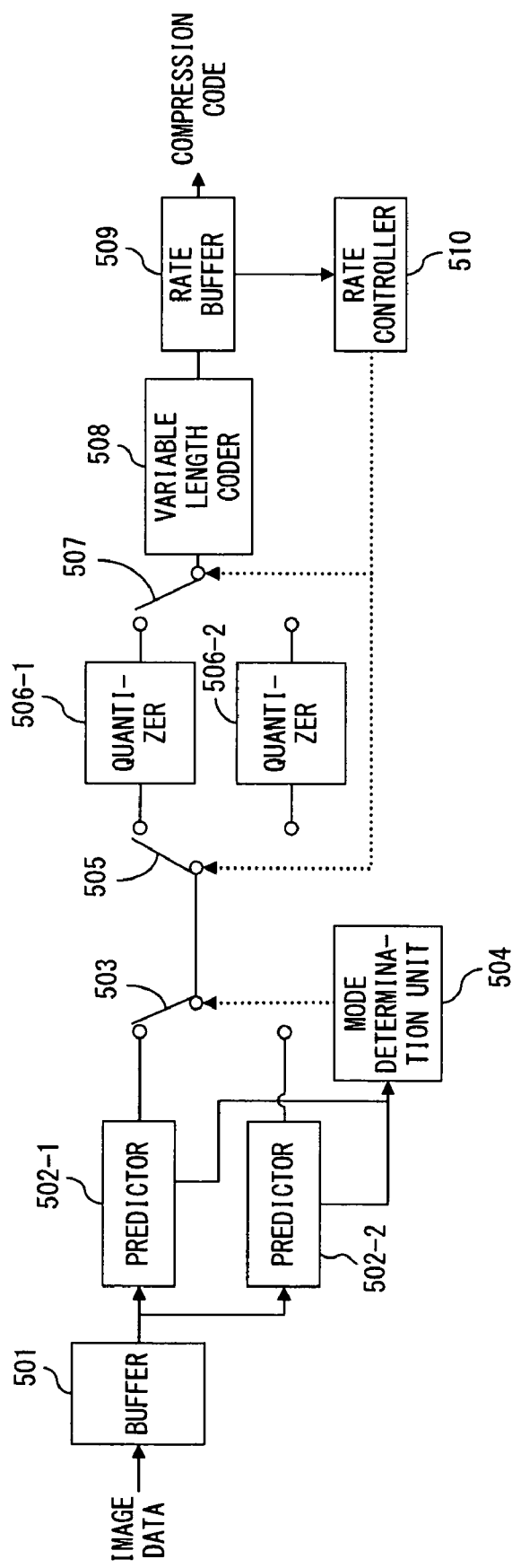
FIG. 5 illustrates a configuration of a hypothetical image compression device.
Figure 7:
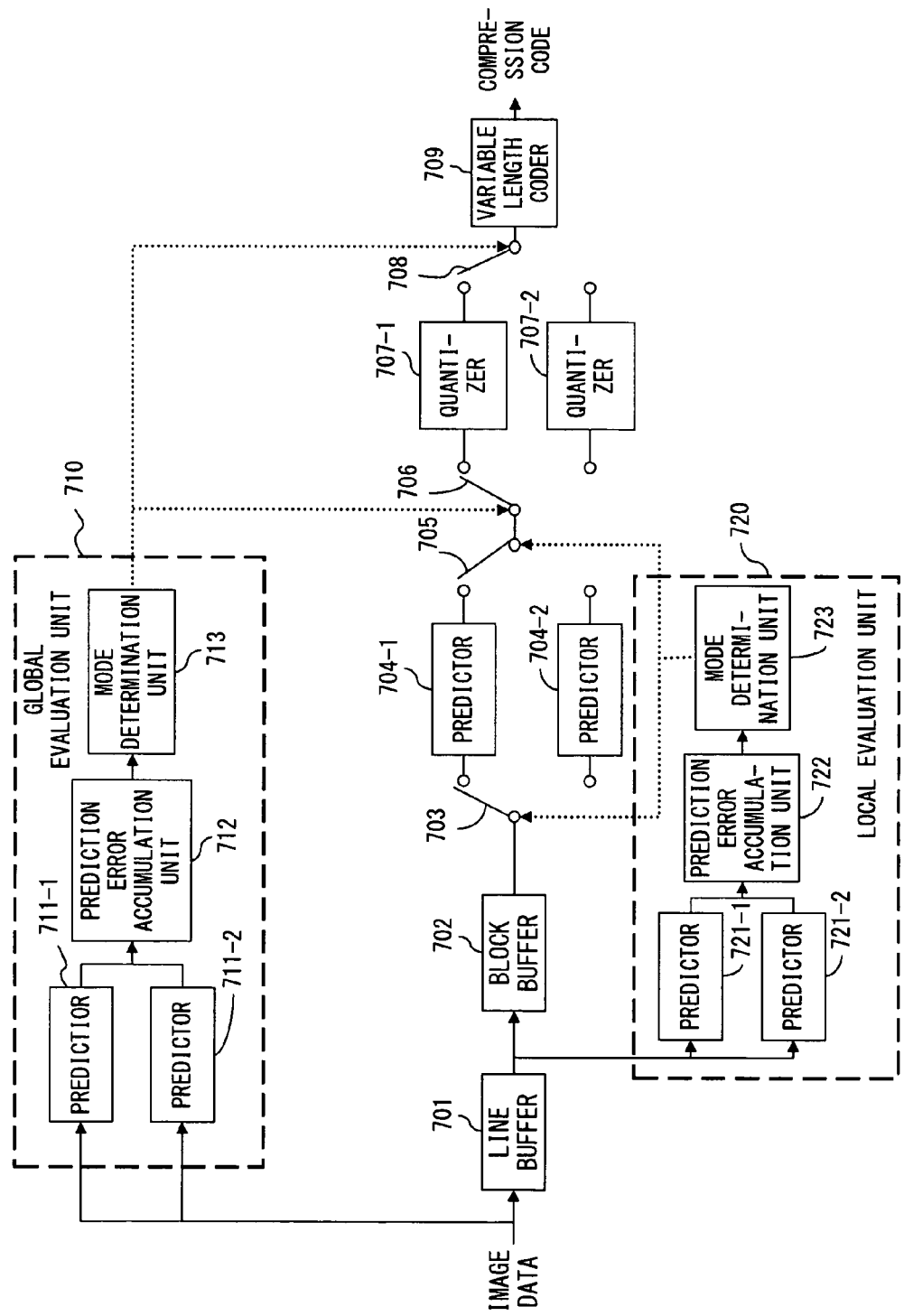
FIG. 7 illustrates a configuration of the first image compression device.

FIG. 7 illustrates an example of a configuration of the image compression device. The image compression device includes a line buffer 701, a block buffer 702, selection units 703, 705, 706, and 708, predictors 704-1 and 704-2, quantizers 707-1 and 707-2, a variable length coder 709, a global evaluation unit 710, and a local evaluation unit 720. The selection units 703, 705, 706, and 708 and the variable length coder 709 correspond to a compression unit.

The global evaluation unit 710 includes predictors 711-1 and 711-2, a prediction error accumulation unit 712, and a mode determination unit 713. The local evaluation unit 720 includes predictors 721-1 and 721-2, a prediction error accumulation unit 722, and a mode determination unit 723.

The line buffer 701 stores, as a line to be compressed, one line of pixels in the input image data. Generally, one line includes a plurality of pixel blocks, and one block includes a prescribed number (for example, eight or sixteen) of pixels. The block buffer 702 stores, as a block to be compressed, one block of pixels in the one line of pixels stored in the line buffer 701. The selection unit 703 selects the predictor 704-1 or 704-2 as the destination of the pixels output from the block buffer 702.

The predictors 704-1 and 704-2 output a prediction error of a target pixel based on the respective different prediction algorithms. The selection unit 705 selects a pixel output from the predictor 704-1 or 704-2. The quantizers 707-1 and 707-2 quantize the prediction error with the respective different quantizing step widths, and the variable length coder 709 converts a quantization representative value into a variable length code, and generates a compression code.

The predictors 711-1 and 711-2 of the global evaluation unit 710 output the prediction error of the pixel input to the line buffer 701 based on the same prediction algorithm as the predictors 704-1 and 704-2, respectively. The pixel corresponds to a pixel of a line after the line to be compressed and stored in the line buffer 701.

The prediction error accumulation unit 712 accumulates prediction errors of one line of pixels by selecting and accumulating the smallest prediction error absolute sum for each block when calculating one line of prediction error accumulation result by using the predictors 711-1 and 711-2. The mode determination unit 713 switches the selection units 706 and 708 based on the smaller prediction error accumulation result in the accumulated prediction errors, and selects the quantizer 707-1 or 707-2. The predictors 721-1 and 721-2 of the local evaluation unit 720 output the prediction error of the pixel output from the line buffer 701 based on the same prediction algorithms as the predictors 704-1 and 704-2, respectively. The pixel corresponds to the pixel of the line to be compressed.

The prediction error accumulation unit 722 accumulates prediction errors of one block of pixels from the predictors 721-1 and 721-2, and the mode determination unit 723 switches the selection units 703 and 705 based on the prediction error accumulation result, that is, the predictor which has output a smaller prediction error out of the accumulated prediction errors, and selects the predictor 704-1 or 704-2. The configuration of the prediction error accumulation units 712 and 722 and the mode determination units 713 and 723 can be, for example, the configuration described in the specification of International Application No. PCT/JP2007/001135.

FIG. 7 illustrates the configuration of switching two predictors and two quantizers, the number of predictors and the quantizers can be three or more so far as there are the same types of predictors provided for the global evaluation unit 710, for the local evaluation unit 720, and as predictors used in a coding process.

With the image compression device above, not only the predictors 704-1 and 704-2 are selectively switched based on a local prediction error, but also the quantizers 707-1 and 707-2 can be selectively switched based on an estimate result of a global prediction error.

By the operation of the local evaluation unit 720, a predictor having a smaller error is selected for each pixel block, thereby reducing the prediction error. By the operation of the global evaluation unit 710, a quantizer is selected based on the image data of a larger range than the block as a processing unit in the compressing process. As a result, a quantizing step width can be determined independent of local information.

Figure 8:
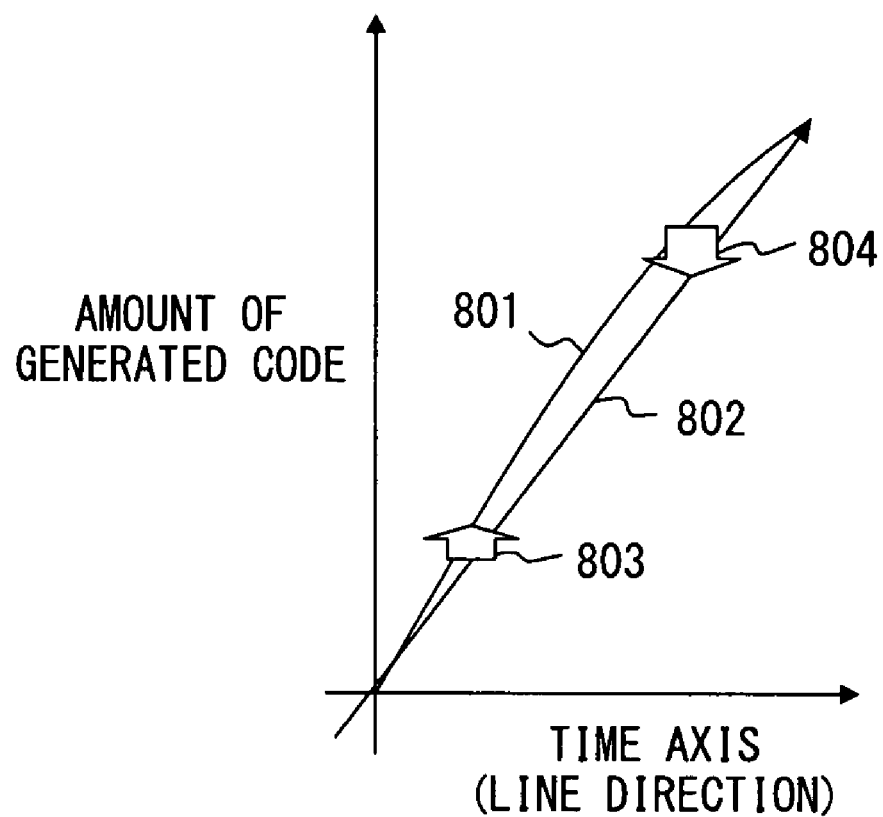
FIG. 8 illustrates a change in amount of generated code when a global evaluation is performed.

If the inclination of the entire line is large prediction error, the increase of a generated code amount 801 after the compression can be suppressed as indicated by an arrow 803 in FIG. 8 by selecting a large quantizing step width in advance. In addition, when a quantizing step width is changed during the process, outstanding degradation of image quality does not occur because the amount of change is not exceedingly large as indicated by an arrow 804. Therefore, the generated code amount 801 is not extremely alienated from an average generated code amount 802, thereby appropriately maintaining the image quality.

As described above, since appropriate predictor and quantizer are selected before performing an actual compressing process, the amount of generated code can be suppressed. With the configuration in FIG. 7, it is necessary to provide the global evaluation unit 710 for performing an estimating process before compression. However, the process is completed for each line by applying the one-dimensional prediction coding method, thereby attaining a low delay and light weight.

Next, the configuration and the operation of the image compression device are described below in more detail with reference to FIGS. 9 through 16. In the following description, it is assumed that an image compression device is loaded into an in-vehicle device, and an image to be compressed can be a natural image and a CG image. For the CG image, a cyclic pattern frequently occurs, and it is necessary to switch between a cyclic pattern predictor for reference to a pixel in the several preceding pixels and a normal predictor.

Figure 9:
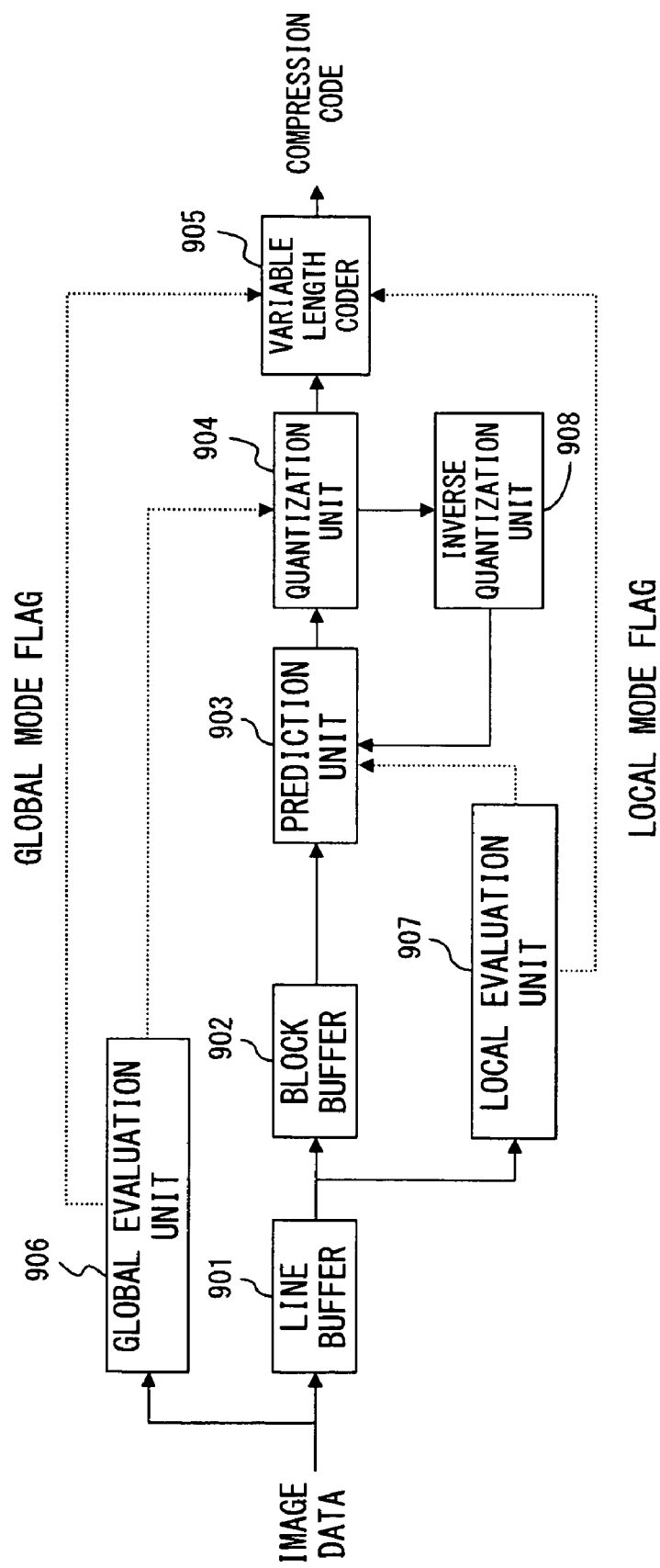
FIG. 9 illustrates a configuration of the second image compression device.
Figure 10:
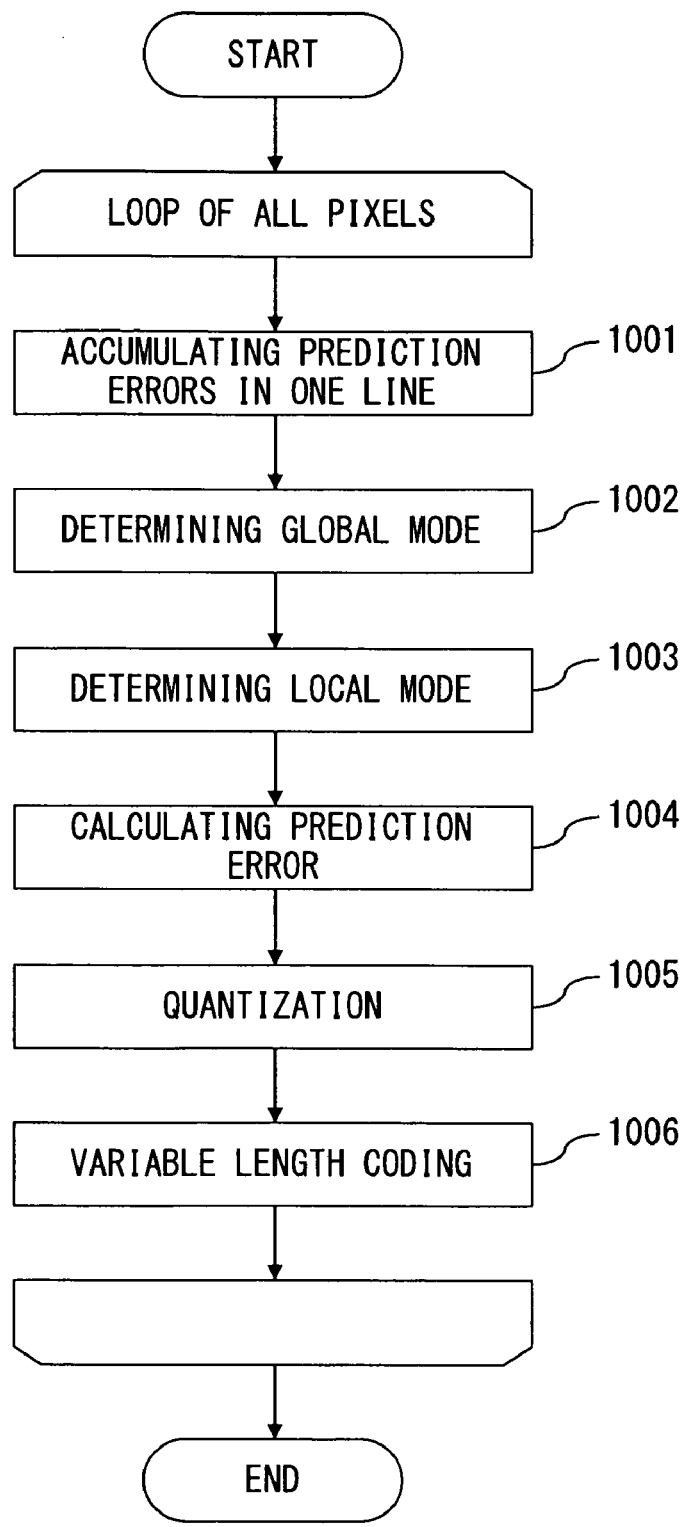
FIG. 10 is a flowchart of the image compressing process.

FIG. 9 illustrates an example of a configuration of the image compression device. FIG. 10 is a flowchart of the image compressing process. The image compression device in FIG. 9 includes a line buffer 901, a block buffer 902, a prediction unit 903, a quantization unit 904, a variable length coder 905, a global evaluation unit 906, a local evaluation unit 907, and an inverse quantization unit 908. The prediction unit 903, the quantization unit 904 and the variable length coder 905 correspond to a compression unit.

The input image data is a set of pixels to be compressed, and the pixels are transmitted in order in the line direction on the screen. First, in advance before the compression, the global evaluation unit 906 accumulates the prediction errors generated in one line for each of plural types of predictors provided in the global evaluation unit 906 (step 1001).

Then, it is determined which quantizer is to be used from the prediction error accumulation result by the predictor which has output the smallest prediction error, and the global mode flag indicating the quantizer to be used is output to the quantization unit 904 and the variable length coder 905 (step 1002). Used as global modes are, for example, global mode 1 in which a quantizer of a small quantizing step width is used and global mode 2 in which a quantizer of a large quantizing step width is used.

The line buffer 901 stores one line of pixels as a line to be compressed, and delays the compressing process on the line until the global evaluation unit 906 accumulates the prediction errors in one line and determines the global mode.

Next, the local evaluation unit 907 calculates the prediction error in each block for each of plural types of predictors provided in the local evaluation unit 907 using the pixel output from the line buffer 901, determines which predictor is used in performing the coding process according to the predictor which has output the smallest prediction error, and outputs the local mode flag indicating a predictor to be used to the prediction unit 903 and the variable length coder 905 (step 1003).

Used as local modes are, for example, local mode 1 using a fourth preceding pixel predictor, local mode 2 using an eighth preceding pixel predictor, and local mode 3 using a normal predictor. The fourth preceding pixel predictor uses the value of the fourth preceding pixel as a predicted value, the eighth preceding pixel predictor uses the value of the eighth preceding pixel as a predicted value, and the normal predictor uses, for example, X' in the equation (1) as a predicted value.

The block buffer 902 stores one block of pixels as a block to be compressed, and delays the compressing process on the block until the local evaluation unit 907 accumulates the prediction errors for one block and determines a local mode.

Next, the prediction unit 903 selects a predictor to be used based on the local mode flag from the local evaluation unit 907 and calculates the prediction error as a difference between the pixel value of the pixel to be compressed (original image) and a predicted value (step 1004).

Next, the quantization unit 904 selects a quantizer to be used based on the global mode flag from the global evaluation unit 906. Then, it quantizes the prediction error output from the prediction unit 903, and outputs a quantization value and a quantization number to both the inverse quantization unit 908 and the variable length coder 905 (step 1005).

The quantizer corresponding to the global mode 1 converts, for example, a prediction error into a quantization value and a quantization number using a quantization table as illustrated in FIG. 11. In the quantization table, the range of the prediction error is divided by a relatively small quantizing step width.

On the other hand, the quantizer corresponding to the global mode 2 converts, for example, a prediction error into a quantization value and a quantization number using a quantization table as illustrated in FIG. 12. In the quantization table, the range of the prediction error is divided by a relatively large quantizing step width.

The inverse quantization unit 908 calculates a pixel value of the decompressed pixel corresponding to the original image by adding the predicted value and the quantization value, and outputs the result to the prediction unit 903.

The variable length coder 905 generates a compression code in a format in which a global mode flag, a local mode flag and a quantization number can be distinguished, and outputs the result to the image decompression device (step 1006). In this case, the quantization number is converted into a variable length code. The image decompression device performs a mode transition based on the global mode flag and the local mode flag included in the compression code.

FIG. 13 is an example of a compression code output from the variable length coder 905. A local mode flag 1301 is output when the leading pixel in a line is compressed for each line. In the case of the global mode 1, for example, a fixed length bit "0" is output. In the case of the global mode 2, for example, a fixed length bit "1" is output.

Local mode flags 1302-1 through 1302-4 are output when the leading pixel in a block is compressed for each block. In the case of the local mode 1, for example, a fixed length bit "00" is output. In the case of the local mode 2, for example, a fixed length bit "01" is output. In the case of the local mode 3, for example, a fixed length bit "10" is output.

Code portions 1303-1 through 1303-4 are a sequence of variable length codes each for one block.

Figure 14:
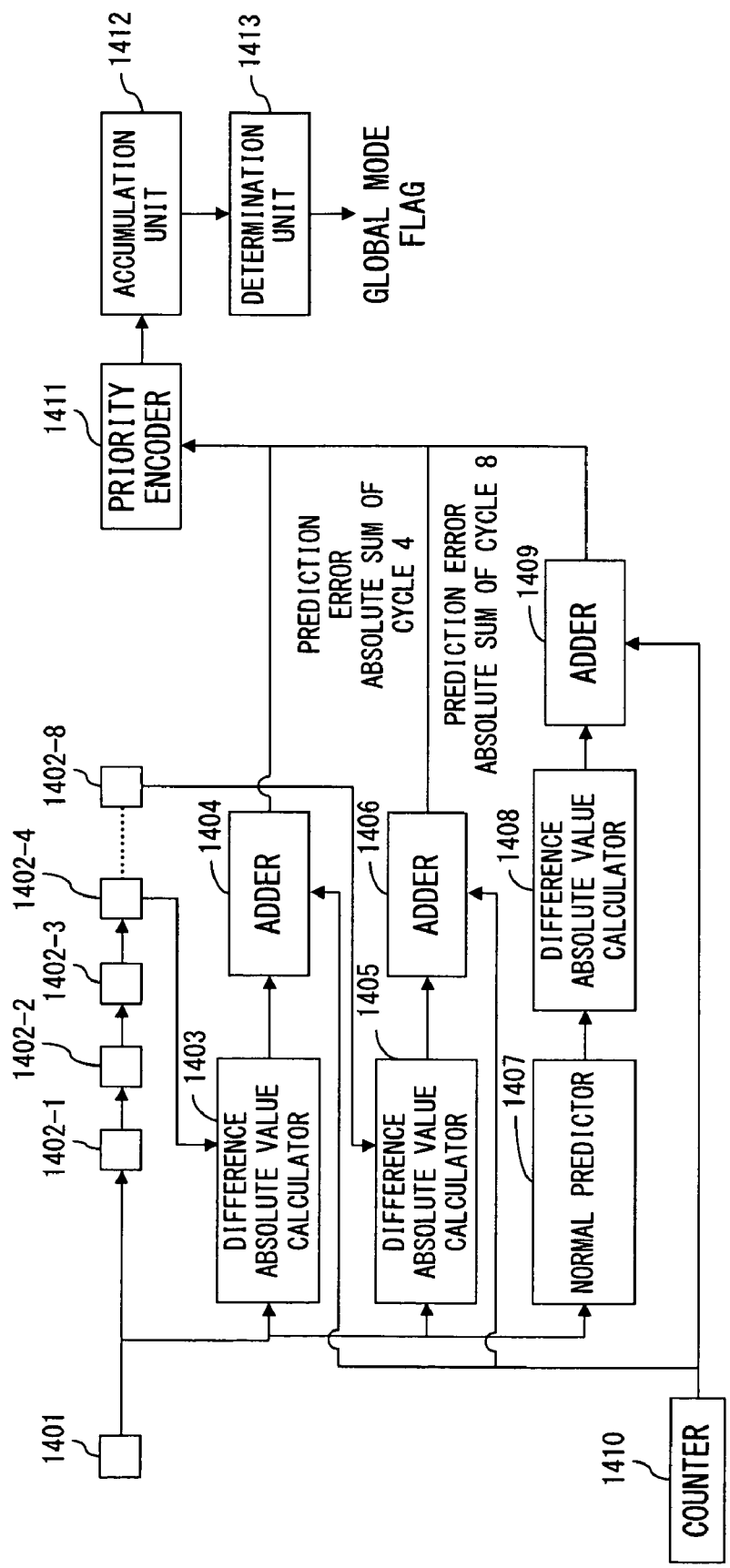
FIG. 14 illustrates a configuration of the global evaluation unit.

FIG. 14 is an example of a configuration of the global evaluation unit 906 in FIG. 9. In the example of the configuration in FIG. 14, three types of predictors are provided in the global evaluation unit 710 in FIG. 7. The global evaluation unit includes registers 1401, 1402-1 through 1402-8, difference absolute value calculators 1403, 1405, and 1408, adders 1404, 1406, and 1409, a normal predictor 1407, a counter 1410, a priority encoder 1411, an accumulation unit 1412, and a determination unit 1413. The difference absolute value calculators 1403, 1405, and 1408 and the normal predictor 1407 correspond to the predictor 711-1 (or 711-2) in FIG. 7. The adders 1404, 1406, and 1409 correspond to the prediction error accumulation unit 712 in FIG. 7. The priority encoder 1411, the accumulation unit 1412, and the determination unit 1413 correspond to the mode determination unit 713 in FIG. 7.

The register 1401 holds the pixel value of an input original image, and the registers 1402-1 through 1402-8 sequentially hold the pixel values output from the register 1401. Therefore, the registers 1402-1 through 1402-8 hold eight consecutive pixel values in the order in which they are input. For example, the register 1402-4 holds the value of the fourth preceding pixel for the original image, and the register 1402-8 holds the value of the eighth preceding pixel for the original image.

The difference absolute value calculator 1403 calculates the difference between the pixel values held by the register 1401 and the register 1402-4 as a prediction error, and outputs the absolute value. The adder 1404 accumulates for one block the prediction error absolute values output from the difference absolute value calculator 1403, and outputs the prediction error absolute sum of cycle 4. In this case, the registers 1402-1 through 1402-4 and the difference absolute value calculator 1403 operate as a fourth preceding pixel predictor.

The difference absolute value calculator 1405 calculates the difference between the pixel values held by the register 1401 and the register 1402-8 as a prediction error, and outputs the absolute value. The adder 1406 accumulates for one block the prediction error absolute values output from the difference absolute value calculator 1405, and outputs the prediction error absolute sum of cycle 8. In this case, the registers 1402-1 through 1402-8 and the difference absolute value calculator 1405 operate as an eighth preceding pixel predictor.

The normal predictor 1407 calculates, for example, X' in the equation (1) as a predicted value, and the difference absolute value calculator 1408 calculates the absolute value of the difference between the pixel value held by the register 1401 and the calculated predicted value. The adder 1409 accumulates for one block the prediction error absolute values output from the difference absolute value calculator 1408, and outputs the prediction error absolute sum.

The counter 1410 resets the accumulation result of the adders 1404, 1406, and 1409 for each block.

In the actual compressing process, one of the local modes 1 through 3 is consistently applied for each block. When the prediction error accumulation result for one line is calculated, the priority encoder 1411 selects the smallest prediction error absolute sum for each block, and outputs it to the accumulation unit 1412.

The accumulation unit 1412 accumulates for one line the prediction error absolute sum for each block output from the priority encoder 1411, and outputs the prediction error accumulation result for each line.

The determination unit 1413 determines the global mode based on the prediction error accumulation result output from the accumulation unit 1412, and outputs a global mode flag. When a prescribed compression rate is to be realized, a global mode is determined by considering the amount of generated code from the prediction error accumulation result for one line and the number of pixels in the one line.

For example, when the conditions in the following expression hold, it is considered that the quantization numbers 1 through 3 which have relatively a small amount of generated code frequently appear although the quantizer in FIG. 11 is used. Therefore, the global mode 1 is selected.

$$\text{prediction error accumulation result for one line/number of pixels in one line} < 7 \quad (2)$$

The left side of the expression (2) indicates the average prediction error per pixel, and the right side of the expression (2) indicates the threshold of the average prediction error. Inversely, when the expression (2) is not satisfied, and when the quantizer illustrated in FIG. 11 is used, there is the possibility that the quantization number 4 or larger which include a relatively large amount of generated code frequently appears. Therefore, to use the quantizer illustrated in FIG. 12, the global mode 2 is selected.

The threshold 7 on the right side of the expression (2) is an example only, and the threshold changes depending on the contents of the quantization table.

Figure 15:
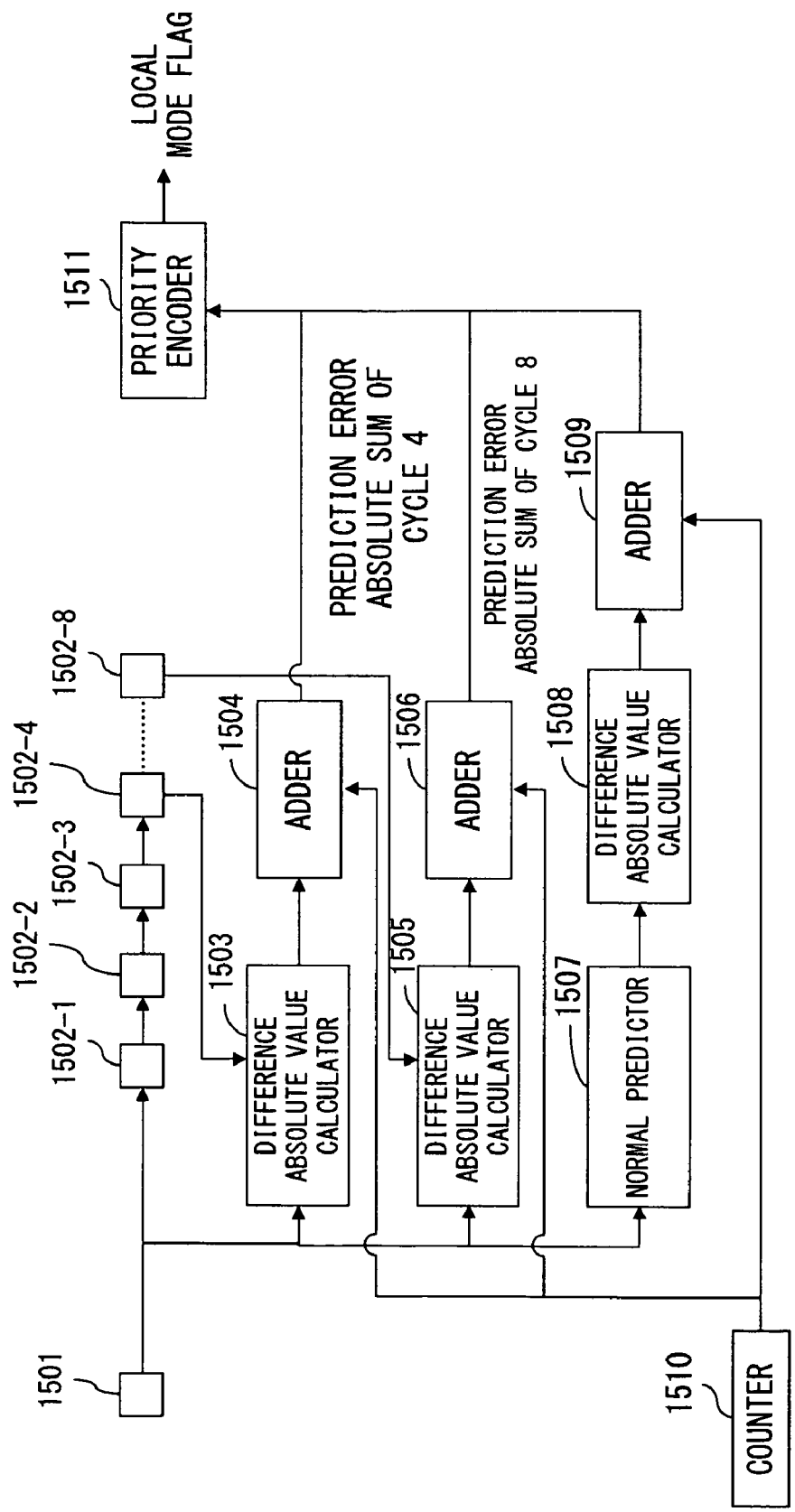
FIG. 15 illustrates a configuration of the local evaluation unit.

FIG. 15 is an example of a configuration of the local evaluation unit 907 in FIG. 9. The example of the configuration in FIG. 15 includes three types of predictors in the local evaluation unit 720. The local evaluation unit includes registers 1501, 1502-1 through 1502-8, difference absolute value calculators 1503, 1505, and 1508, adders 1504, 1506, and 1509, a normal predictor 1507, a counter 1510, and a priority encoder 1511. The difference absolute value calculators 1503, 1505, and 1508 and the normal predictor 1507 correspond to the predictor 721-1 (or 721-2) in FIG. 7. The adders 1504, 1506, and 1509 correspond to the prediction error accumulation unit 722 in FIG. 7. The priority encoder 1511 corresponds to the mode determination unit 723 in FIG. 7.

Among them, the operations of the registers 1501, 1502-1 through 1502-8, the difference absolute value calculators 1503, 1505, and 1508, the adders 1504, 1506, and 1509, the normal predictor 1507, and the counter 1510 are similar to the operations of the registers 1401, 1402-1 through 1402-8, the difference absolute value calculators 1403, 1405, and 1408, the adders 1404, 1406, and 1409, the normal predictor 1407, and the counter 1410.

The priority encoder 1511 determines which of the local modes 1 through 3 is to be consistently applied to the block next input to the block buffer 902, and outputs a local mode flag. In this case, the priority encoder 1511 compares the prediction error absolute sums (prediction error accumulation result for one block) output from the adders 1504, 1506, and 1509, and selects the predictor which has generated the smallest prediction error absolute sum.

Therefore, if the prediction error absolute sum of the adder 1504 is the smallest, the local mode 1 in which the fourth preceding pixel predictor is used is selected. If the prediction error absolute sum of the adder 1506 is the smallest, the local mode 2 in which the eighth preceding pixel predictor is used is selected. If the prediction error absolute sum of the adder 1509 is the smallest, the local mode 3 in which the normal predictor is used is selected.

Figure 16:
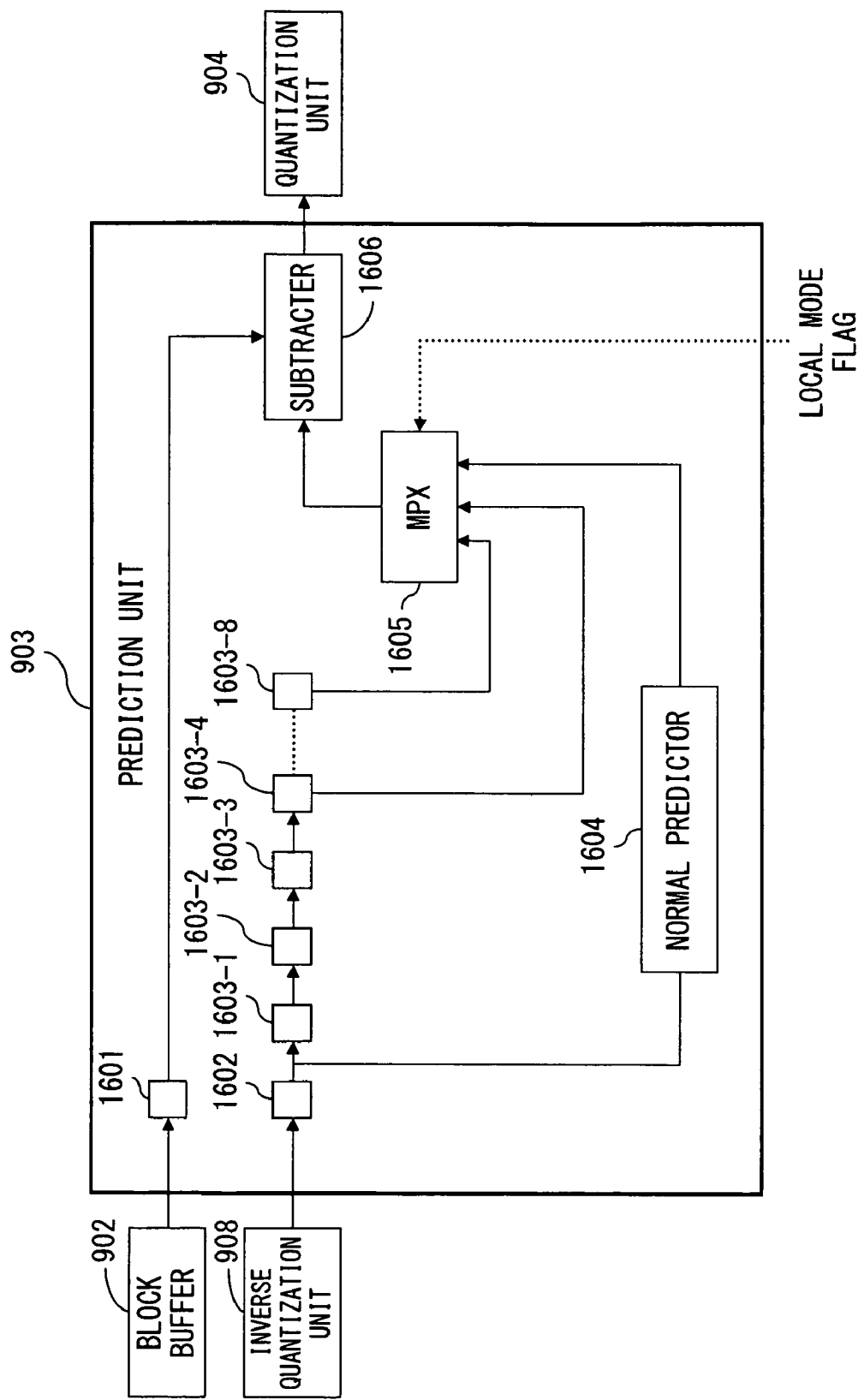
FIG. 16 illustrates a configuration of the first prediction unit.

FIG. 16 illustrates an example of a configuration of the prediction unit 903. The example of the configuration illustrated in FIG. 16 is provided with three types of predictors in the image compression device in FIG. 7. The prediction unit 903 includes registers 1601, 1602, 1603-1 through 1603-8, a normal predictor 1604, a multiplexer (MPX) 1605, and a subtracter 1606. The registers 1601, 1602, 1603-1 through 1603-8 and the normal predictor 1604 correspond to the predictor 704-1 (or 704-2) in FIG. 7.

The register 1601 holds the pixel value of the original image output from the block buffer 902, and the register 1602 holds the pixel value of the decompressed pixel output from the inverse quantization unit 908. The registers 1603-1 through 1603-8 sequentially hold the pixel values output from the register 1602. Therefore, the registers 1603-1 through 1603-8 hold eight consecutive pixel values in the order in which they are input. For example, the register 1603-4 holds the value of the fourth preceding pixel relative to the decompressed pixel, and the register 1603-8 holds the value of the eighth preceding pixel relative to the decompressed pixel.

The normal predictor 1604 calculates, for example, X' in the equation (1) as a predicted value, and outputs it to the MPX 1605.

The MPX 1605 selects one of the pixel value held by the register 1603-4, the pixel value held by the register 1603-8, and the output value of the normal predictor 1604 according to the local mode flag, and outputs the value as a predicted value to the subtracter 1606. When the local mode flag refers to the local mode 1, the pixel value of the register 1603-4 is selected. When it refers to the local mode 2, the pixel value of the register 1603-8 is selected. When it refers to the local mode 3, the output value of the register 1603-4 is selected.

The subtracter 1606 calculates the prediction error by subtracting the predicted value from the pixel value held by the register 1601, and outputs the result to the quantization unit 904.

Thus, the prediction unit 903 operates as a fourth preceding pixel predictor in the local mode 1, operates as a eighth preceding pixel predictor in the local mode 2, and operates as a normal pixel predictor in the local mode 3.

Next, the configuration and the operation of the image decompression device for decompressing a compression code to generate original image data is described below with reference to FIGS. 17 through 21.

Figure 17:
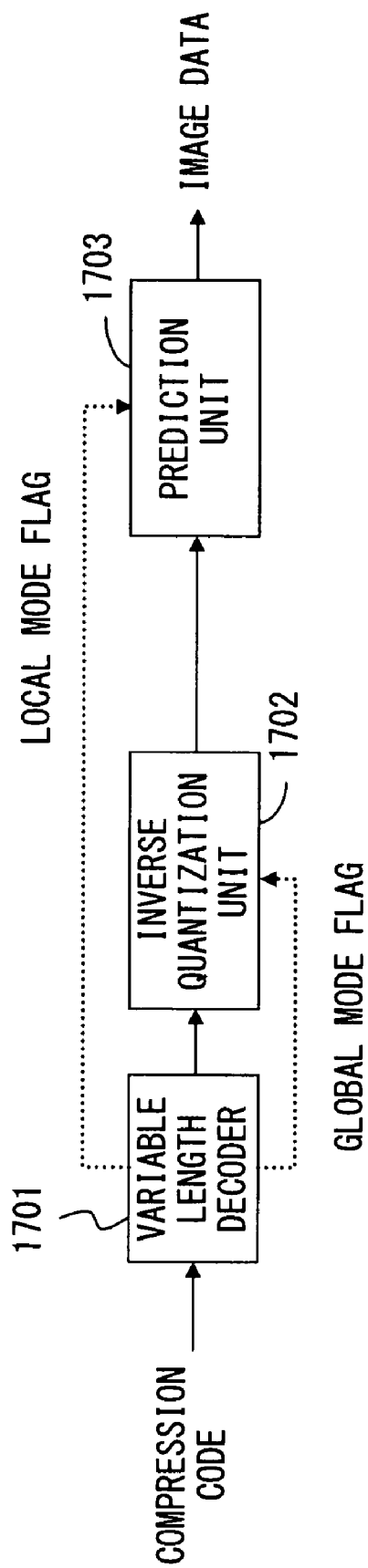
FIG. 17 illustrates a configuration of the image decompression device.

FIG. 17 illustrates an example of a configuration of the image decompression device, and FIG. 18 is a flowchart of the image decompressing process. The image decompression device in FIG. 17 is loaded into an in-vehicle device with the image compression device, and includes a variable length decoder 1701, an inverse quantization unit 1702, and a prediction unit 1703.

The variable length decoder 1701 extracts a global mode flag, a local mode flag, and a code portion from the compression code output from the image compression device, performs variable length decoding on the code portion, thereby generating a quantization number (step 1801). The global mode flag is extracted from the leading bit of the line, and output to the inverse quantization unit 1702 together with the quantization number. The local mode flag is extracted from the leading two bits of the block, and output to the prediction unit 1703.

Next, the inverse quantization unit 1702 selects an inverse quantizer to be used according to the global mode flag from the variable length decoder 1701. Then, it inversely quantizes the quantization number output from the variable length decoder 1701, generates a prediction error quantization value, and outputs it to the prediction unit 1703 (step 1802).

The inverse quantizer corresponding to the global mode 1 converts, for example, a quantization number into a prediction error quantization value based on the inverse quantization table as illustrated in FIG. 19. On the other hand, the quantizer corresponding to the global mode 2 converts, for example, a quantization number into a prediction error quantization value based on the inverse quantization table as illustrated in FIG. 20. It is obvious that the quantization table stored by the image compression device and the inverse quantization table stored by the image decompression device correspond to each other, and has the same step widths.

Next, the prediction unit 1703 selects according to the local mode flag from the variable length decoder 1701 a predictor to be used (step 1803), and calculates a predicted value of the decompressed pixel (step 1804). In the local mode 1, the fourth preceding pixel predictor is selected. In the local mode 2, the eighth preceding pixel predictor is selected. In the local mode 3, the normal pixel predictor is selected.

The prediction unit 1703 adds the obtained predicted value to the prediction error quantization value output from the inverse quantization unit 1702, calculates the pixel value of the decompressed pixel, and outputs the value as image data (step 1805). It is obvious that the types of the predictors of the image compression device correspond to the types of the predictors of the image decompression device, respectively.

Figure 21:
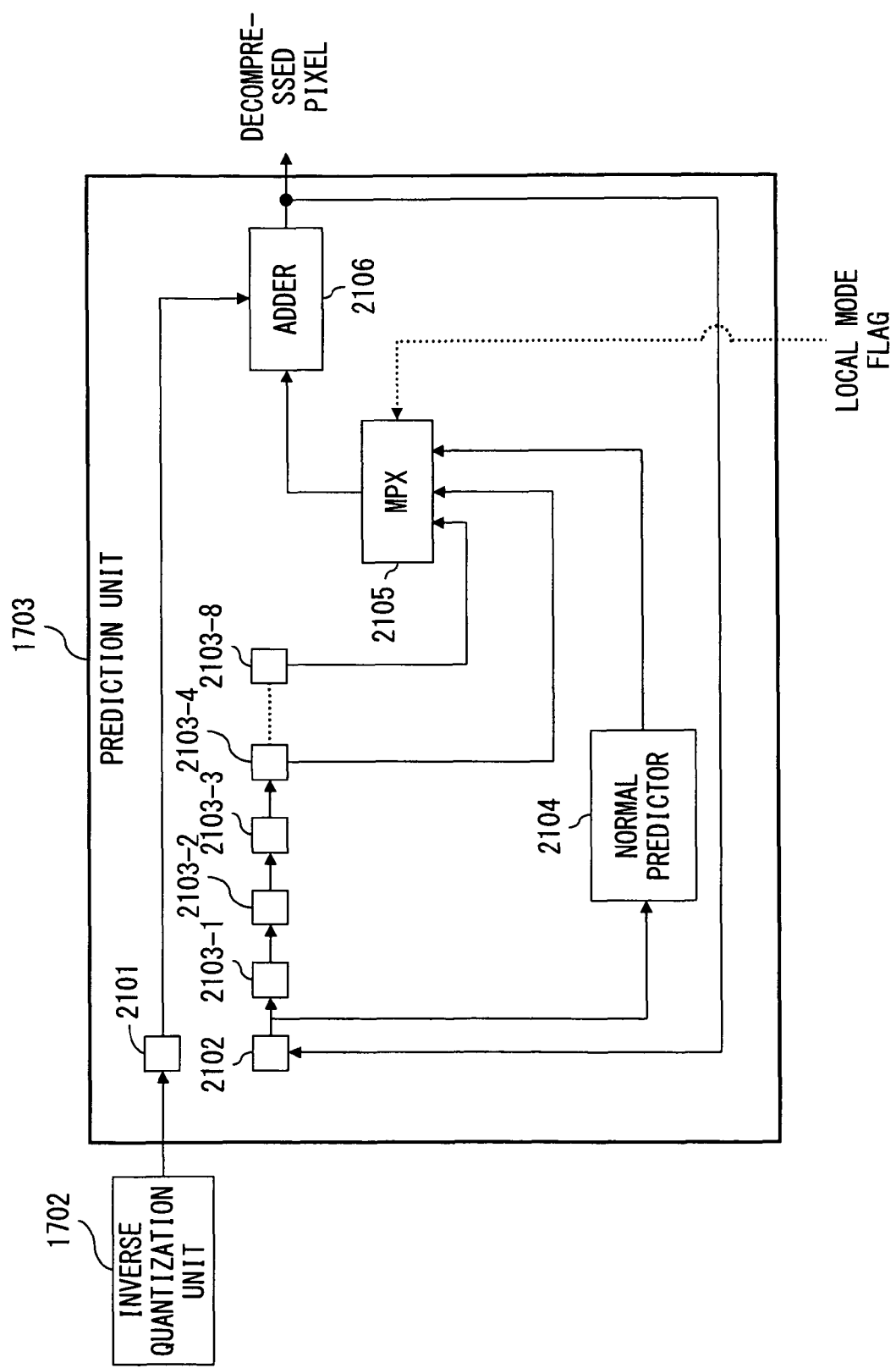
FIG. 21 illustrates a configuration of the second prediction unit.

FIG. 21 illustrates an example of a configuration of the prediction unit 1703 in FIG. 17. The prediction unit 1703 includes registers 2101, 2102, 2103-1 through 2103-8, a normal predictor 2104, an MPX 2105, and an adder 2106.

The register 2101 holds the prediction error quantization value output from the inverse quantization unit 1702, and the register 2102 holds the pixel value of the decompressed pixel output from the adder 2106. The registers 2103-1 through 2103-8 sequentially hold the pixel value output from the register 2102. Therefore, the registers 2103-1 through 2103-8 hold eight consecutive pixel values in the order in which they are input. For example, the register 2103-4 holds the fourth preceding pixel value relative to the decompressed pixel, and the register 2103-8 holds the eighth preceding pixel value relative to the decompressed pixel.

The normal predictor 2104 calculates, for example, X' in the equation (1) as a predicted value, and outputs the value to the MPX 2105.

The MPX 2105 selects, according to a local mode flag, one of the pixel value held by the register 2103-4, the pixel value held by the register 2103-8, and the output value of the normal predictor 2104, and outputs the value as a predicted value to the adder 2106. When the local mode flag refers to the local mode 1, the pixel value of the register 2103-4 is selected. When the local mode flag refers to the local mode 2, the pixel value of the register 2103-8 is selected. When the local mode flag refers to the local mode 3, the output value of the normal predictor 2104 is selected.

The adder 2106 adds the predicted value to the prediction error quantization value held by the register 2101 to calculate the pixel value of the decompressed pixel, and outputs the result to the register 2102 and the image display unit not illustrated in the attached drawings. The pixel value of the decompressed pixel is output to the register 2102 for use in generating a predicted value.

Thus, the prediction unit 1703 operates as a fourth preceding pixel predictor in the local mode 1, operates as a eighth preceding pixel predictor in the local mode 2, and operates as a normal predictor in the local mode 3.

In the embodiments illustrated in FIGS. 9 through 21, it is assumed that the image compression device and the image decompression device are loaded into an in-vehicle device, but the use of the image compression device and the image decompression device is not limited to this application, but the devices are widely applied to general image data.

In addition, in the embodiments illustrated in FIGS. 9 through 21, three predictors, two quantizers, and two inverse quantizers are switched, but generally the present invention can be applied to a plurality of predictors, a plurality of quantizers, and a plurality of inverse quantizers.

Furthermore, the configurations of the predictor, the quantizer, the inverse quantizer are not limited to those illustrated in FIGS. 11, 12, 14 through 16, and 19 through 21, and the configuration of the compression code is not limited to the configuration illustrated in FIG. 13.

When the processes of the image compression device in FIGS. 7 and 9 and the image decompression device in FIG. 17 are realized by software, for example, the information processing device (computer) illustrated in FIG. 22 is used. The information processing device in FIG. 22 includes a CPU 2201, memory 2202, an input device 2203, an output device 2204, an external storage device 2205, a medium drive device 2206, and a network connection device 2207. These components are interconnected through a bus 2208.

The memory 2202 includes, for example, a read only memory (ROM), a random access memory (RAM), etc, and stores a program and data used in a process. The memory 2202 is also used as a line buffer 901 and a block buffer 902 in FIG. 9. The CPU 2201 uses the memory 2202 to execute a program, thereby performing the processes of the image compression device and the image decompression device.

The input device 2203 is, for example, a keyboard, a pointing device, etc., and used in inputting an instruction and information from an operator. The output device 2204 is, for example, a display, a printer, a speaker, etc., and is used in outputting an inquiry to an operator and a process result. The process result includes decompressed image data.

The external storage device 2205 is, for example, a magnetic disk device, an optical disk device, a magneto optical disk device, a tape device, etc. The information processing device stores a program and data in the external storage device 2205, and loads them into the memory 2202 for use as necessary.

The medium drive device 2206 drives the portable storage medium 2209, and accesses the stored contents. The portable storage medium 2209 is any computer-readable recording medium such as a memory card, a flexible disk, an optical disk, a magneto optical disk, etc. An operator stores a program and data in the portable storage medium 2209, and loads them into the memory 2202 for use as necessary.

The network connection device 2207 is connected to the communication network such as a local area network (LAN) for data conversion during the communication. The network connection device 2207 transmits a generated compression code to the image decompression device, or receives a compression code from the image compression device. The information processing device receives a program and data from an external device through the network connection device 2207 as necessary, and loads them into the memory 2202 for use.

FIG. 23 illustrates the method of providing a program and data to the information processing device in FIG. 22. The program and data stored in the portable storage medium 2209 or the database 2311 of the external device 2301 are loaded into the memory 2202 of the information processing device 2302. The external device 2301 generates a carrier signal for transmission of the program and data, and transmits the signal to the information processing device 2302 through any transmission medium on the communication network. The CPU 2201 executes the program using the data, and performs the above-mentioned processes.

What is claimed is:

1. An image compression device using a prediction coding method, the image compression device comprising:
    plural types of predictors;
    plural types of quantizers;
    a global evaluation unit to perform a prediction for one line in an image to be compressed by using each of the plural types of predictors, and to determine one quantizer out of the plural types of quantizers based on a prediction error amount of a predictor having a smallest prediction error;
    a local evaluation unit to perform a prediction for a prescribed pixel block in the one line by using each of the plural types of predictors, and to identify one predictor out of the plural types of predictors based on a type of a predictor having a smallest prediction error; and
    a compression unit to compress data of the prescribed pixel block by using the predictor identified by the local evaluation unit and the quantizer determined by the global evaluation unit.

2. The image compression device according to claim 1, wherein
    the global evaluation unit determines a quantizer having a relatively large quantizing step width as the quantizer when the prediction error amount is large.

3. The image compression device according to claim 1, further comprising
    a line buffer to store pixel values of the one line, wherein
    the local evaluation unit generates the prediction error by the prediction performed using a pixel value output from the line buffer, and the global evaluation unit calculates the prediction error amount by the prediction performed using a pixel value input to the line buffer.

4. An image decompression device using a prediction coding method, the image decompression device comprising:
    a reception unit to receive quantizer information indicating one quantizer out of plural types of quantizers determined based on a prediction error amount of a predictor having a smallest prediction error by performing a prediction for one line in an image to be compressed by using each of -plural types of predictors, predictor information indicating one predictor out of the plural types of predictors identified based on a type of a predictor having a smallest prediction error by performing a prediction for a prescribed pixel block in the one line by using each of the plural types of predictors, and compressed image data obtained by compressing data of the prescribed pixel block by using the identified predictor and the determined quantizer; and
    a decompression unit to decompress the compressed image data to generate the image to be compressed by using an inverse quantizer corresponding to the quantizer indicated by the quantizer information, and the predictor indicated by the predictor information.

5. A computer-readable recording medium storing a program for a computer which performs an image compressing process using a prediction coding method, the program directing the computer to perform:

performing a prediction for one line in an image to be compressed by using each of plural types of predictors, and determining one quantizer out of plural types of quantizers based on a prediction error amount of a predictor having a smallest prediction error;

performing a prediction for a prescribed pixel block in the one line by using each of the plural types of predictors, and identifying one predictor out of the plural types of predictors based on a type of a predictor having a smallest prediction error; and compressing data of the prescribed pixel block by using the identified predictor and the determined quantizer.

6. The recording medium according to claim 5, wherein the computer determines a quantizer having a relatively large quantizing step width as the quantizer when the prediction error amount is large.

7. The recording medium according to claim 5, wherein the computer generates the prediction error by the prediction performed using a pixel value output from a line buffer to store the pixel values of the one line, and calculates the prediction error amount by the prediction performed using a pixel value input to the line buffer.

8. A computer-readable recording medium storing a program for a computer which performs an image decompressing process using a prediction coding method, the program directing the computer to perform:

receiving quantizer information indicating one quantizer out of plural types of quantizers determined based on a prediction error amount of a predictor having a smallest prediction error by performing a prediction for one line in an image to be compressed by using each of -plural types of predictors, predictor information indicating one predictor out of the plural types of predictors identified based on a type of a predictor having a smallest prediction error by performing a prediction for a prescribed pixel block in the one line by using each of the plural types of predictors, and compressed image data obtained by compressing data of the prescribed pixel block by using the identified predictor and the determined quantizer; and decompressing the compressed image data to generate the image to be compressed by using an inverse quantizer corresponding to the quantizer indicated by the quantizer information, and the predictor indicated by the predictor information.

* * * * *

UNITED STATES PATENT AND TRADEMARK OFFICE
CERTIFICATE OF CORRECTION

PATENT NO.         : 8,358,861 B2
APPLICATION NO.    : 12/926953
DATED              : January 22, 2013
INVENTOR(S)        : Junichi Odagiri It is certified that error appears in the above-identified patent and that said Letters Patent is hereby corrected as shown below:

In the Claims:

Column 14, Line 50, In Claim 4, delete "-plural" and insert -- plural --, therefor.
Column 16, Line 7, In Claim 8, delete "-plural" and insert -- plural --, therefor.

Signed and Sealed this
Thirtieth Day of April, 2013

Teresa Stanek Rea
*Acting Director of the United States Patent and Trademark Office*